United States Patent [19]

Shepherd

[11] Patent Number: 5,003,843
[45] Date of Patent: Apr. 2, 1991

[54] SAW CHAIN HOLDING MECHANISM FOR GRINDING MACHINES

[76] Inventor: James E. Shepherd, P.O. Box 2719, White City, Oreg. 97503

[21] Appl. No.: 524,568

[22] Filed: May 17, 1990

[51] Int. Cl.⁵ .............................................. B23D 63/16
[52] U.S. Cl. ....................................... 76/78.1; 76/80.5
[58] Field of Search .......................... 76/80.5, 78.1, 37

[56] References Cited

U.S. PATENT DOCUMENTS

Re. 28,057   7/1974   Silvey .
3,349,645  10/1967   Silvey .
4,416,169  11/1983   Silvey ................................. 76/80.5
4,836,058   6/1989   Shepherd .

Primary Examiner—Roscoe V. Parker
Attorney, Agent, or Firm—Eugene M. Eckelman

[57] ABSTRACT

A base is arranged to be mounted on a saw chain grinding machine adjacent to a saw chain holding bar. A shaft has first and second projections engageable with the cutter elements for holding the cutter elements down and laterally against an opposite side wall of the edge slot of the saw chain holding bar. The second projection engages the cutter elements prior to the first projection.

6 Claims, 3 Drawing Sheets 5,003,843

SAW CHAIN HOLDING MECHANISM FOR GRINDING MACHINES

BACKGROUND OF THE INVENTION

This invention relates to new and useful improvements in saw chain holding mechanisms for grinding machines.

Many saw chain grinding machines employ a chain holding bar or plate on which the chain is mounted for engagement by a grinding wheel. These bars have a longitudinal edge slot that receives the drive tines of the chain in slidable guided engagement. The drive tines frequently become damaged or misaligned on the chain, and for this purpose the slot in the chain holding bar is intentionally manufactured with side play for the tines so that they will readily slide along the groove when adjusting the chain along the bar.

In order to anchor the chain for holding it in a fixed position when engaged by the grinding wheel, prior saw chain grinding machines have chain stabilizing means in association with the chain holding bar. For example, U.S. Pat. No. 3,349,645 provides a saw chain grinding machine with a combination of stop pawl that hooks behind the cutter elements to hold them against retracting movement with relation to longitudinal forces when engaged by the grinding wheel, a hold-down lever securing cutter elements being ground against vertical movement, and a stabilizing anvil on the opposite side of the cutter element being ground from the hold-down lever for stabilizing the cutter elements against lateral forces imparted to them by the grinder. Similarly, U.S. Reissue Pat. No. 28057 provides a stop pawl, a hold-down lever, and a stabilizing anvil.

With these prior structures the cutter elements tend to assume different upright anchored positions relative to other of the cutter elements on the chain since even with the operation of a stop pawl, a hold-down lever and a stabilizing anvil, the drive tines may assume varied upright positions in the bar slot. This causes a non-uniform grind of the cutting edges and corners of the chain and an efficient grinding function is not achieved.

SUMMARY OF THE INVENTION

According to the present invention and forming a primary objective thereof, holding mechanism for saw chain grinding machines is provided that not only functions to hold the chain down but also first drives the cutter elements to an upright position against a defining side wall of the slot in the saw chain holding bar whereby all the cutter elements will be positioned precisely the same and thus will receive the same grind.

In carrying out the objectives of the invention, base means are disposed on a saw chain grinding machine in adjacent relation to a saw chain holding bar. Movable means are mounted on the base means and are arranged for selected movement relative to the saw chain holding bar. The movable means has first and second projections, the first projection holding the cutter element down and the second projection holding the cutter element laterally against a defining side wall of the edge slot of the saw chain holding bar, thus positioning each of the cutter elements identically upright for grinding. The movable means are operated by an operator controlled drive arranged to control engagement and disengagement of the projections from the cutter elements.

The invention will be better understood and additional objects and advantages will become apparent from the following description taken in connection with the accompanying drawings.

DETAILED DESCRIPTION OF A PREFERRED EMBODIMENT

Figure 1:
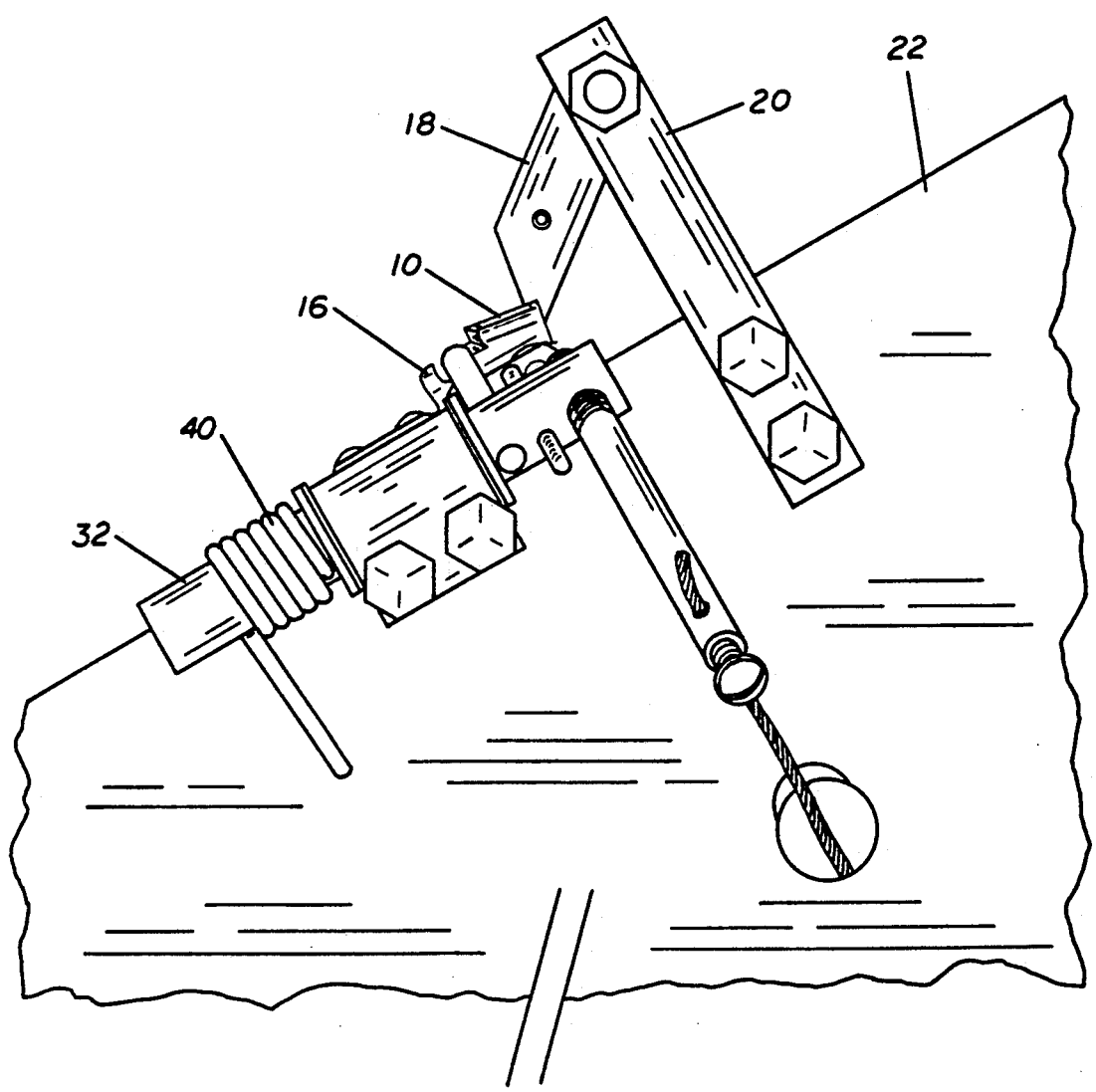
FIG. 1 is a side elevational view of the holding mechanism of the present invention.

With particular reference to the drawings, the present holding mechanism is designed to hold saw chains in a positive position for grinding. One cutter element or link 10 only is shown in the drawings and as is well known, these cutter elements are connected to side plates 12 and tines 14 that ride in the saw bar slot of a chain saw. The side plates of the cutter elements ride on the edge of the bar and the tines guide the chain around the bar. Each of the cutter elements has a depth gauge 16.

Conventional saw chain grinders have a stop pawl 18, FIG. 1, arranged to engage the rear edge of a cutter element and hold the cutter element stationary during a grinding step. Stop pawl 18 is pivotally supported on an upright stationary link 20. The chain is advanced forward under the pawl 18 for subjecting the next cutter element to a grinding step.

Chain saw grinding machines also usually employ a chain holder 22 in the form of a bar or plate. Bar 22 has an edge slot 24 similar to the slot in a chain saw bar, the slot 24 having a sufficient width for some lateral play of the cutter element tines therein even though the tines may be slightly bent or misaligned. Bar 22 has suitable integrated support on a portion 26 of the grinding machine that supports an adjustable stabilizing anvil 28 on the opposite side of the cutter element from the grinding forces of the grinding wheel. A base member 30 is integrated with the bar 22 on the side opposite from the anvil 28 and provides journaled support for a shaft 32 extending parallel to the bar 22. Shaft 32 has a first projection 34 arranged to bear down on the top of the side plates of the cutter elements in an engaged position of the holding mechanism. This projection, when suitably rotated with the shaft 32, is capable of holding the cutter elements firmly down in the slot 24 of the bar 22. Shaft 32 has a second projection 36 arranged to bear against the adjacent side surface of the side plates for pushing the cutter elements laterally such that all the tines in the grinding position of the cutter elements firmly engage the opposite defining side wall of the slot 34. The end of projection 36 projects laterally beyond the end of projection 34 and thus is arranged to engage the cutter element prior to engagement of the cutter by the projection 34, whereby the cutter elements will be pushed flush against the far side of the slot 24 prior to positive seating of the cutter element in the slot. Projection 36, although structurally strong, may have slight resiliency to insure proper sequential engagement of the two projections with the cutter elements.

Figure 2:
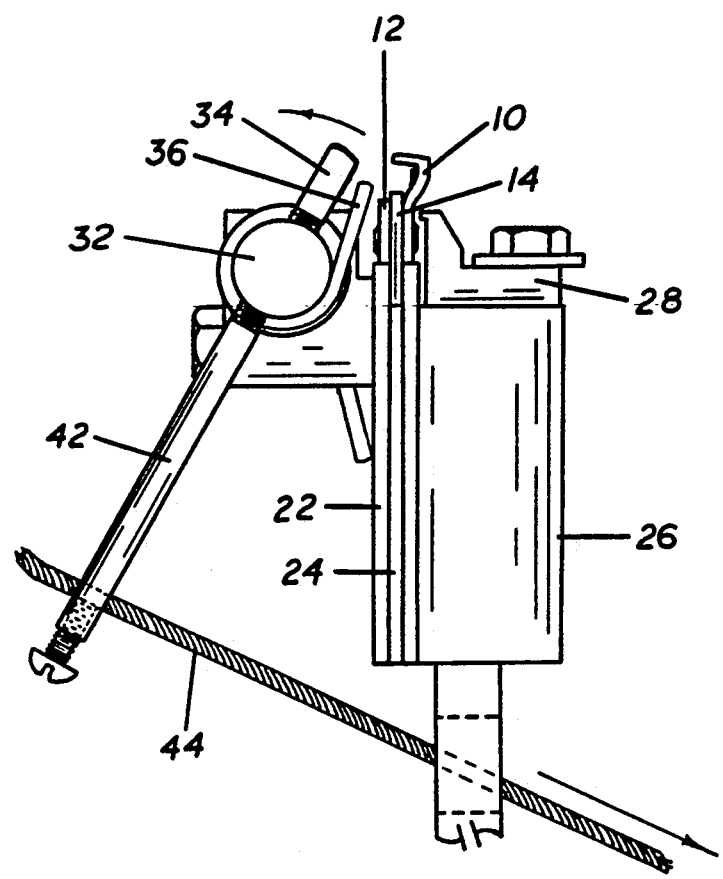
FIG. 2 is an end view of the mechanism taken from the left of FIG. 1, the mechanism being shown in disengaged position relative to a cutter element.
Figure 3:
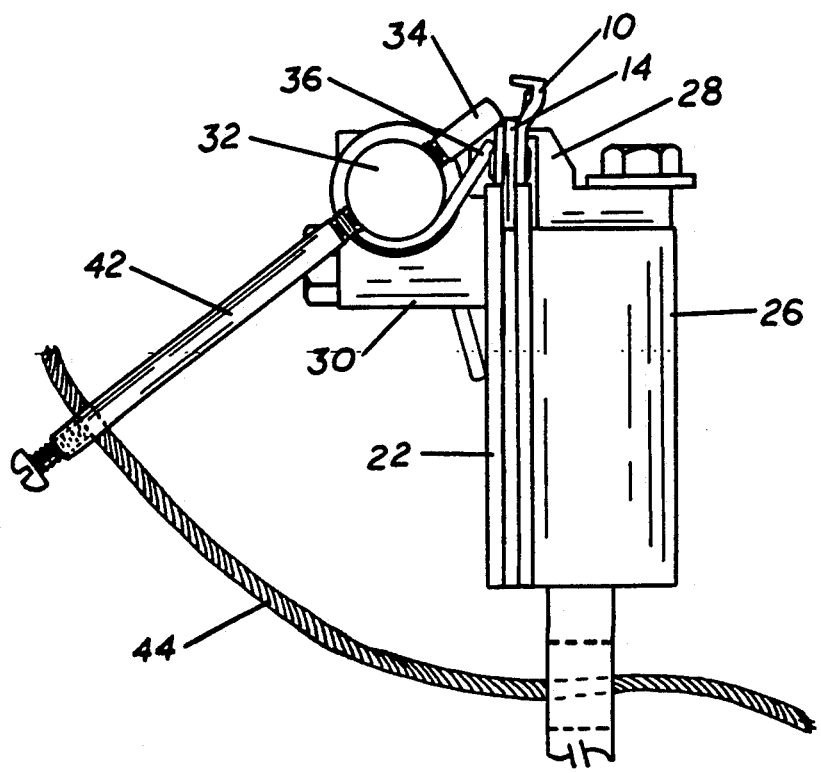
FIG. 3 is a view similar to FIG. 2 but showing the hold-down mechanism in engaging position with the cutter element.
Figure 5:
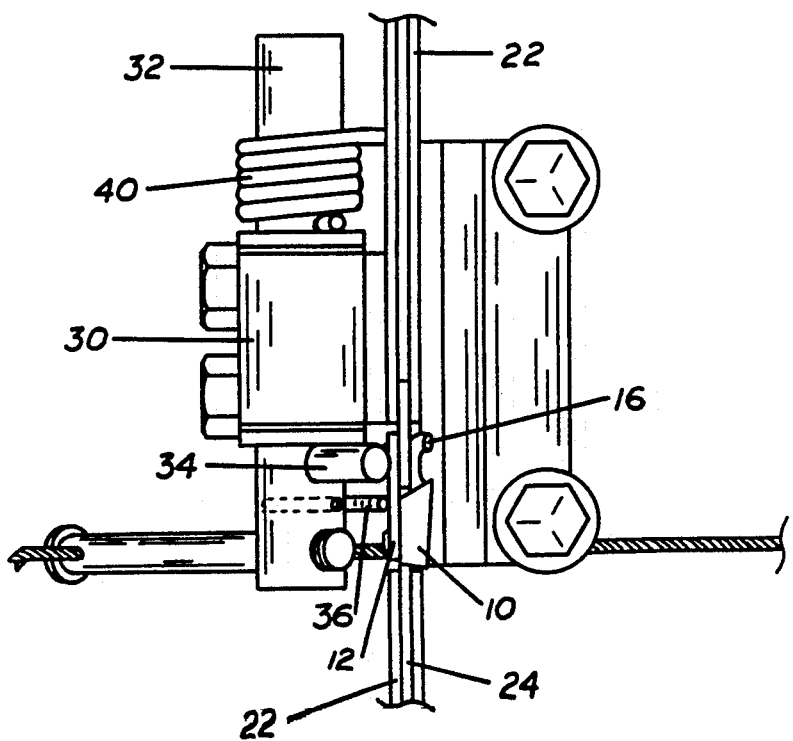
FIG. 5 is a view similar to FIG. 4 but showing the holding mechanism in engaged position.

Shaft 32 is urged in a clockwise direction, FIGS. 2 and 3, by a coil spring 40 having opposite ends anchored on the shaft and base member 30, respectively. In normal rest position of the shaft, FIGS. 3 and 5, projections 34 and 36 bear forcefully against the cutter elements to provide vertical and lateral holding functions on the cutter element.

An operating lever 42, in turn connected to an operator controlled cable 44, is secured to the shaft 32 and is arranged upon a tension force being applied to the cable to rotate the shaft 32 against the force of coil spring 40 for disengaging the projections 34 and 36 from the cutter elements.

Figure 4:
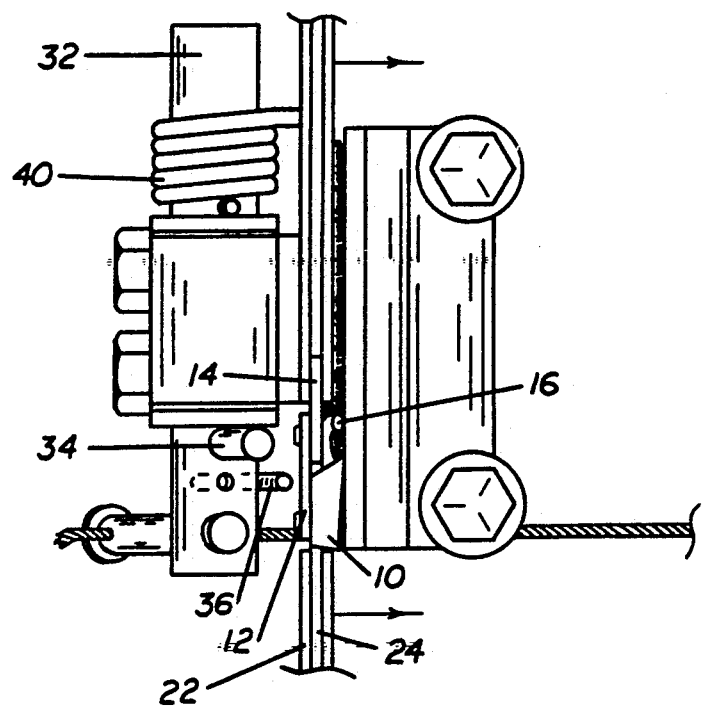
FIG. 4 is a top plan view showing the holding mechanism in its disengaged position.

In the operation of the present invention, a saw chain is mounted on the bar 22 with the tines in the slot 24. To position the chain for a grinding step, the operator tensions the cable 44 to rotate the shaft to the FIGS. 2 and 4 position whereby the chain can be moved such that a cutter element is backed up against the stop pawl 18. Thereupon the operator releases the cable 44 and the spring 40 causes the projections 34 and 36 to engage the cutter element. In such engagement, the projection 36 first engages a side of the cutter element to drive it laterally flush against the opposite side wall of the slot and against the rear stop 28 and then the first projection 34 drives the cutter element down into a firm seated position while at the same time vertically stabilized by the projection 36.

By means of the present structure, the upright position of all cutter elements flush against the far side of the slot 24 will be identical rather than being at varied upright positions which may result from play in the widened slot 24.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Holding mechanism for use with a saw chain grinding machine having a saw chain holding bar with an edge slot which receives the drive tines of cutter elements of the saw chain for supporting the chain in a stationary position for grinding, said holding mechanism comprising:
    base means arranged to be disposed on a saw chain grinding machine in adjacent relation to a saw chain holding bar,
    movable means on said base means arranged for selected movement relative to the saw chain holding bar,
    first and second projections on said movable means,
    said first projection being arranged to engage and hold a cutter element down and said second projection being arranged to engage and hold a cutter element laterally against a defining side wall of the edge slot of the saw chain holding bar in a selected movement of said movable means,
    said second projection engaging the cutter element prior to said first projection to position the cutter element against the defining side wall of the edge slot of the saw chain holding bar prior to engagement of the cutter element by said first projection.

2. The mechanism of claim 1 wherein said movable means comprises a rotatable shaft and spring means engageable with said shaft urging it rotatable to a cutter element engaging position of said projections.

3. The mechanism of claim 2 including operator controlled drive means connected to said shaft arranged to disengage said projections from a cutter element engaged position.

4. In combination,
    a saw chain grinding machine,
    a saw chain holding bar on said machine having an edge slot defined by opposite side walls and arranged to receive the drive tines of cutter elements of a saw chain,
    movable means on said grinding machine having selected movement relative to said saw chain holding bar,
    first and second projections on said movable means,
    said first projection being arranged to engage and hold a cutter element down and said second projection being arranged to engage and hold a cutter element laterally against a defining side wall of the edge slot of said saw chain holding bar in a selected movement of said movable means,
    said second projection engaging the cutter element prior to said first projection to position the cutter element against said defining side wall of the edge slot of the saw chain holding bar prior to engagement of the cutter element by said first projection.

5. The combination of claim 4 wherein said movable means comprises a rotatable shaft and spring means engageable with said shaft urging it rotatably to a cutter element engaging position of said projections.

6. The combination of claim 5 including operator controlled drive means connected to said shaft arranged to disengage said projections from a cutter element engaged position.

* * * * *